United States Patent [19]

McNeill

[11] 3,886,531

[45] May 27, 1975

[54] SCHOTTKY LOADED EMITTER COUPLED MEMORY CELL FOR RANDOM ACCESS MEMORY

[75] Inventor: Jon L. McNeill, Dallas, Tex.

[73] Assignee: Texas Instruments Incorporated, Dallas, Tex.

[22] Filed: Feb. 11, 1974

[21] Appl. No.: 441,085

[52] U.S. Cl. ......... 340/173 R; 340/173 FF; 307/291

[51] Int. Cl. ............................................ G11c 11/40

[58] Field of Search .................. 340/173 R, 173 FF; 307/291

[56] References Cited

UNITED STATES PATENTS 3,619,667 4/1969 Gerlach ............................ 307/291

OTHER PUBLICATIONS

IBM Tech. Dis. Bul., Vol. 13, No. 2, July 1970, pp. 302–303, "Fet Memory Using Schottky Diodes as Load Devices," Gaeusslen et al.

IBM Tech. Dis. Bul., Vol. 15, No. 1, June 1972, p. 260, "Doubleemitter-Bit Line Schottky Memory Cell," Platt.

*Primary Examiner*—Terrell W. Fears
*Attorney, Agent, or Firm*—Harold Levine; James T. Comfort; William E. Hiller

[57] ABSTRACT

A memory cell for a random access memory, the cell including a bistable circuit having first and second cross-coupled transistors with plural emitters. One emitter of each of the first and second transistors is coupled in common. The collector loads for the first and second transistors are provided by respective Schottky diodes which enable the differential voltage in the memory cell to remain low and the cell to be unsaturated over an order of magnitude of current increase to provide for a higher ratio of cell read current to cell store current. Additionally, hard saturation of the memory cell which would otherwise increase the write time is eliminated by this construction.

1 Claim, 3 Drawing Figures

SCHOTTKY LOADED EMITTER COUPLED MEMORY CELL FOR RANDOM ACCESS MEMORY

The present invention generally relates to memory storage devices or memory cells for use in a random access memory for a digital computer and more particularly to a memory cell of the so-called emitter coupled type including a bistable circuit having first and second transistors provided with Schottky diodes as loads for the collectors thereof. This memory storage cell is capable of performing readout of a binary digit stored therein in a non-destructive manner upon interrogation thereof.

An electronic computer typically includes a memory system comprising a multiplicity of memory elements or cells in which information may be stored as binary digits, wherein such information consists of either a "1" or a "0" as denoted by "high" or "low" voltage values, for example. These individual memory cells are arranged in arrays in matrix form, such that each individual cell can store at least one binary digit, or bit. By adding identical memory cells, any type of memory or storage system could be theoretically designed for virtually unlimited capacity. However, practical considerations as to the economics involved with respect to the increase in expense in relation to the increase in storage capacity effectively limit the amount of storage capacity that can be built into such a memory. This aspect may be offset to some extent by providing for extremely high-speed operation and access to the information contained in the memory. Thus, the design of individual memory cells has been directed in large measure to achieving a low cost memory cell capable of extremely high speed operation. One such memory cell structure has involved the use of a bistable circuit comprising cross-coupled transistors commonly known as a flip-flop circuit. Such a flip-flop circuit is capable of storing a discrete binary digit therein, such that a different binary digit may be stored in each of the first and second stable states of the bistable circuit which the flip-flop comprises. Heretofore, the operating speed of a memory cell of the flip-flop type in switching from one state to the other has been considered as relatively high, while the power of the cell has been considered relatively low.

In accordance with the present invention, an improved storage device or memory cell is provided, wherein the memory cell comprises a bistable circuit in which first and second transistors are connected in cross-coupled relationship, with respective Schottky diodes being provided as loads therefor. More specifically, the first and second transistors of the bistable circuit are of bipolar type and include respective emitter pairs, with one emitter of each emitter pair being commonly coupled, and the first and second Schottky diodes corresponding to the transistors being respectively connected to the collectors thereof. Such a construction for a memory cell appreciably increases the speed thereof in comparison to a flip-flop or bistable circuit of known construction. Access time has been determined to be of the order of five times faster than that of a typical conventional transistor bistable circuit. Additionally, the stored current or "hold" current can be maintained at a lower value for any "sense" current, enabling a higher ratio of cell read current to cell store current. This is accomplished in part in that the Schottky diodes may be provided as collector contacts and have characteristics permitting the differential voltage in the memory cell to remain low and and the cell unsaturated over an order of magnitude of current increase. Thus, the Schottky diodes effectively prevent hard saturation of the cell and thereby decrease the write time.

Other features and advantages of the invention will be more fully understood from the following more detailed description as set forth in the specification when taken together with the accompanying drawings in which.

Figure 1:
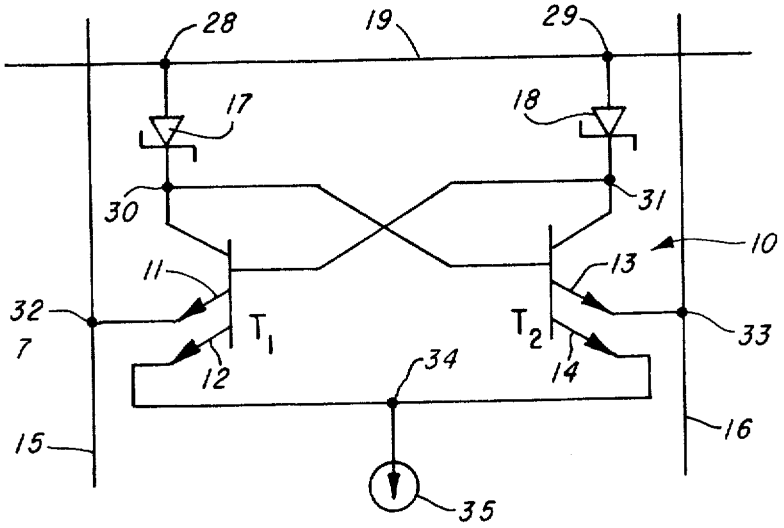
FIG. 1 is a schematic circuit diagram showing a memory cell constructed in accordance with the present invention.
Figure 2:
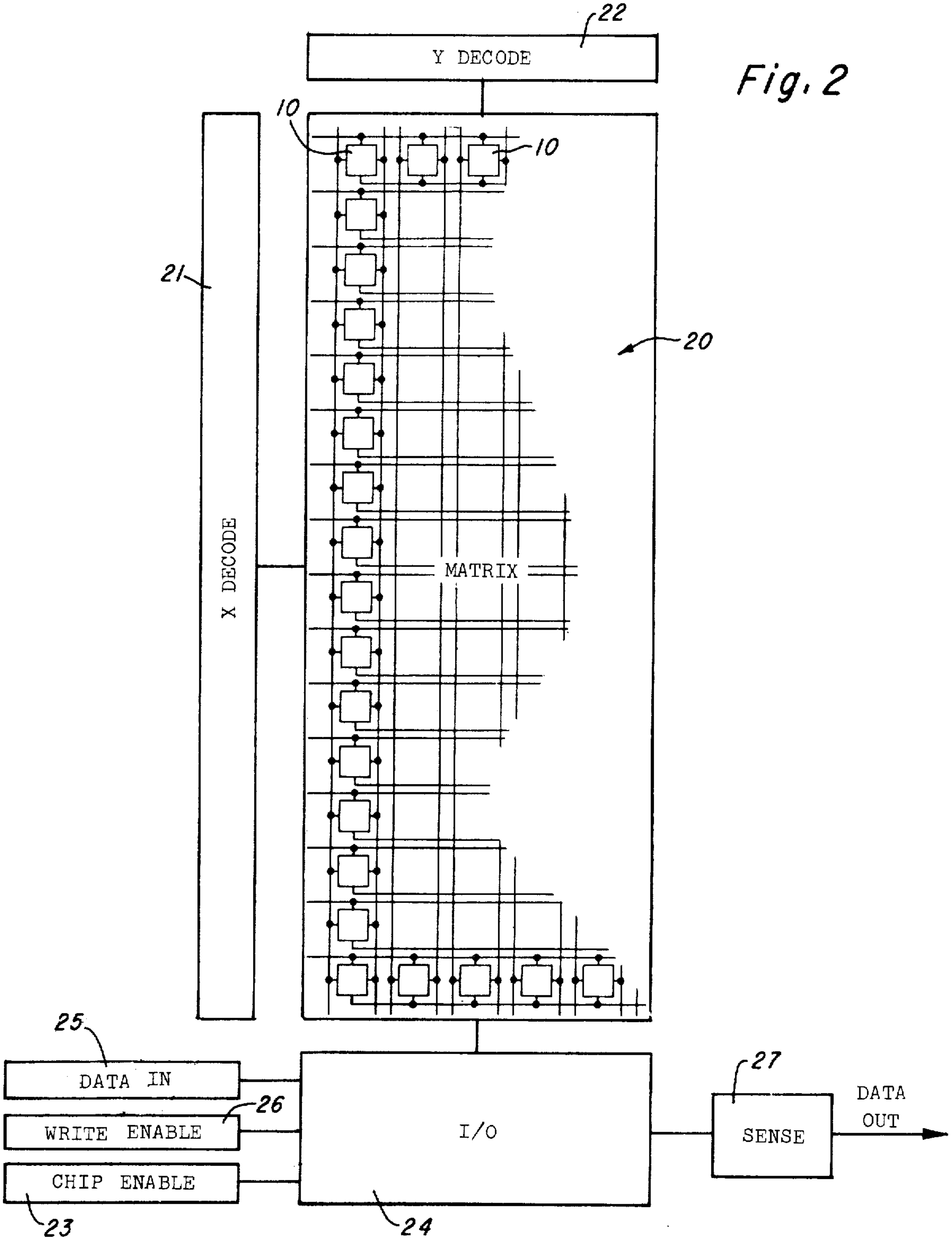
FIG. 2 is a block diagram of a digital computer system including a memory matrix made up of a plurality of memory cells as illustrated in FIG. 1.

Referring more specifically to the drawings, FIG. 1 illustrates a memory cell as constructed in accordance with the present invention, the memory cell being broadly designated by the reference numeral 10. A multiple number of such memory cells 10 are arranged in respective arrays to form individual matrices for the memory of a digital computer system, such as illustrated in FIG. 2. By way of a specific example, a random access memory system may be provided in which 256 word or bit locations or addresses may be formed in a single chip of semiconductor material. To this end, a memory matrix 20 is provided on a single chip of semiconductor material, the memory matrix 20 comprising a plurality of individual memory cells 10 as illustrated in FIG. 1. These individual memory cells 10 are arranged in a plurality of intercepting rows and columns, with each word address being defined by a row-column intersection. Thus, there are sixteen rows and sixteen columns in each matrix 20 to provide 256 separate addresses as defined by the respective intersections of rows and columns. The chip 20 of semiconductor material as shown in FIG. 2 receives row and column address input signals X1–X4 and Y1–Y4 applied respectively to an X decode unit 21 representative of row decode circuitry and a Y decode unit 22 representative of a column decode circuitry of the chip 20. The X decode unit 21 and the Y decode unit 22 respectively produce row and column select signals corresponding to the input address, thereby selecting that input address as the row-column intersection in the matrix 20. It will be understood that the complete random access memory system will have a plurality of chips 20 so as to provide a large storage capacity for the memory system. To this end, a chip enable circuit 23 is provided in conjunction with the input/output 24 of the digital computer system for selecting one particular chip 20 of the plurality thereof upon receiving chip select input signals determinative thereof. For example, 32 individual semiconductor chips 20 may be provided, the semiconductor chips 20 being interconnected as described and being individually enabled or selected by the chip enable circuitry 23 which is responsive to chip select input signals.

In a sixteen row and column matrix 20 as described herein, each word location or address is defined by an individual memory cell 10 as shown in FIG. 1. The X decode unit 21 may be a high select decoder so as to pull the positive voltage line of "X" decode line of one row of cells 10 in the matrix 20 high. The Y decode unit 22 may be a low select decoder such that fifteen of the cell sense line pairs respectively associated with the memory cells 10 in a single column of the matrix 20 are held at any one time, with one pair of Y decode emitter followers going low. Thus, the fifteen cells 10 which are selected low by the Y decode unit 22 are not sufficiently biased to turn on their access emitters, and the one cell of the 256 cells in the maxtrix 20 addressed by both the X decode unit 21 and the Y decode unit 22 will be the selected cell indicative of a row-column intersection defining a word or bit location or address.

It will be understood that the memory system includes suitable external command circuitry, such as a data input (DATA IN) unit 25 and write enable circuitry 26 interfaced with the plurality of chips 20 through the input/output 24 which itself interfaces with sense circuitry 27 for data output or read out from the memory system.

Referring now specifically to the memory cell 10 illustrated in FIG. 1, the memory cell 10 comprises a bistable transistor circuit including cross-coupled NPN transistors $T_1$ and $T_2$, respectively. In this connection, the bases of the two transistors $T_1$, $T_2$ are respectively dc coupled to the collector of the other transistor. Each transistor $T_1$, $T_2$ includes a pair of emitters, the transistor $T_1$ having emitters 11, 12 and the transistor $T_2$ having emitters 13, 14, respectively. One emitter of each emitter pair is coupled in common. In this respect, the emitter 12 of transistor $T_1$ and the emitter 14 of transistor $T_2$ are coupled in common. The other emitter of each emitter pair is respectively connected to one of the pair of sense/write lines with which the particular memory cell 10 is associated. To this end, it will be observed that the emitter 11 of transistor $T_1$ is connected to the sense/write line 15, while the emitter 13 of transistor $T_2$ is connected to the sense/write line 16.

In accordance with the present invention, the collectors of each of the transistors $T_1$, $T_2$ are loaded with respective Schottky diode devices 17, 18 which have been found to significantly increase the switching speed of the bistable transistor circuit comprising the memory cell 10. A positive voltage line 19 which serves as the "X" decode line is provided for each row of cells 10, the positive voltage line 19 being respectively connected at terminals 28, 29 to the Schottky diode devices 17, 18. Respective terminals 30, 31 are interposed in the connecting conductor extending between the collector of each transistor $T_1$, $T_2$ and the respective Schottky diode device 17, 18 associated therewith. The terminals 30, 31 complete the cross-coupling of the two transistors $T_1$, $T_2$, wherein the bases thereof are coupled to the collector of the other transistor, as previously described. The emitters 11 and 13 of transistors $T_1$ and $T_2$ respectively may be termed access or sense emitters, these emitters 11 and 13 being connected at terminals 32 and 33 to the sense/write lines 15 and 16. The commonly coupled emitters 12 and 14 of transistors $T_1$ and $T_2$ may be termed store emitters. Completing the assembly of the bistable transistor circuit comprising the memory cell 10, the commonly coupled store emitters 12, 14 are connected at terminal 34 to a "word" or "store" current source 35.

The memory cell 10 may be termed a Schottky loaded emitter coupled cell and offers significant advantages in the areas of speed-power and in bar size with respect to the manufacture of semiconductor chips 20 including an array thereof in a 16 by 16 matrix, for example. For purposes of comparison to demonstrate the improved nature of the Schottky loaded emitter coupled cell 10 as constructed in accordance with the present invention, a typical bistable transistor circuit of a resistor loaded type may be considered. Assume that the necessary hold voltage at the input sides of the load resistors designed as $\Delta V_H$ is $\geq$ 150mV and that the maximum sense voltage in the respective sense lines designated as $\Delta V_S$ is $\geq$ 500mV to prevent hard saturation, then:

$$\frac{I_H}{I_S} = \frac{\Delta V_H}{\Delta V_S} = \frac{150\ mV}{500\ mV} = 3/10$$

where $I_H$ and $I_S$ are the hold current and the sense current respectively.

Assuming an array power, such that $$\Sigma I_H + \Sigma I_S = 28.8\ mA$$
$$I_S = 265\ uA$$
$$I_H = 79\ uA$$
$$R_L = \frac{150\ mV}{79\ uV} = 1898\ \text{Ohms}$$

where $R_L$ is the load resistance of the resistor employed in each branch of the bistable transistor circuit.

Turning to the Schottky loaded emitter coupled cell 10 of the present invention, and assuming that the total array power is identical to that assumed for the typical resistor cell, then:

$V_H = 165$ mV $\Delta V = 330$ mV $- 165$ mV $= 165$ mV $V_S = 330$ mV $$r_L = \frac{\Delta V}{\Delta I} = \frac{165\ mV}{500\ uV} = 330\ \text{Ohms}$$

where $r_L$ is the load resistance of each of the Schottky diode devices 17, 18.

Comparing the switching speed of the resistor loaded cell and the Schottky loaded emitter coupled cell 10,

$$\frac{\tau RES}{\tau SCH} = \frac{RC_{RES}}{RC_{SCH}} = \frac{1898\Omega}{330\Omega} = 5.75,$$

or an advantage of more than five times faster speed in the favor of the Schottky loaded emitter coupled cell 10.

Figure 3:
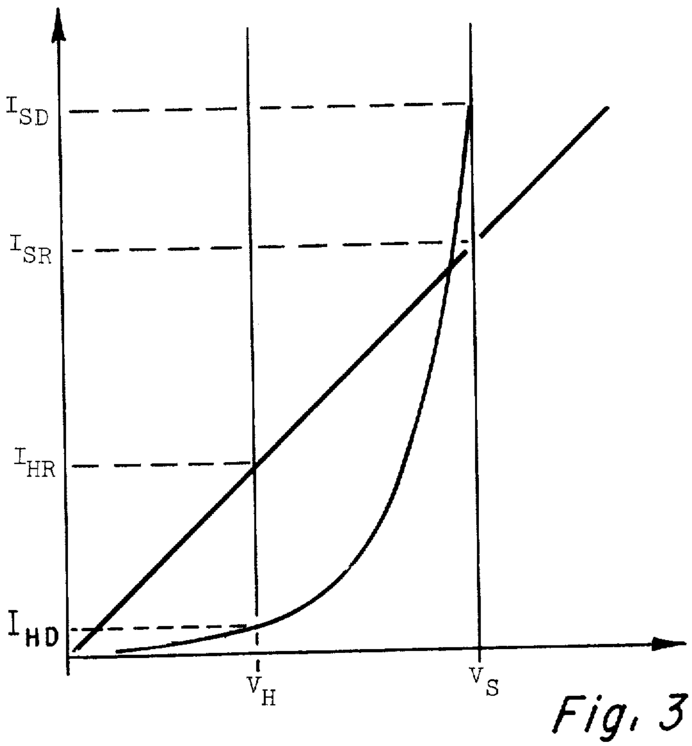
FIG. 3 is a graph illustrating the comparison between operating parameters of a resistor loaded transistor bistable circuit serving as a memory cell and the Schottky diode loaded memory cell of FIG. 1.

In addition to the speed advantage provided by the Schottky loaded emitter coupled cell 10 of the present invention as comprared to known bistable transistor circuits employed as memory cells, other advantages also accrue as depicted by the graph shown in FIG. 3.

The symbols shown along the ordinate and the abscissa of this graph are identified as follows:

$I_{HD}$ — Schottky diode hold current;

$I_{SD}$ — Schottky diode sense current;

$I_{HR}$ — Resistor hold current;

$I_{SR}$ 13 Resistor sense current; and $V_H$ and $V_S$ are the hold voltage and the sense voltage, respectively.

Thus, it can be seen that at the hold voltage $V_H$, $I_{HD} < I_{HR}$, while at the sense voltage $V_S$, $I_{SD} > I_{SR}$.

Both of these comparisons further work to the advantage of the Schottky loaded emitter coupled cell 10 as contrasted to a resistor loaded bistable transistor circuit as heretofore known.

Referring now to the operation of the memory cells 10 in a matrix thereof as provided on a single semiconductor chip 20, the X decode unit 21 controls the positive voltage line for each of the sixteen rows of cells 10. Upon receiving a row address input signal from any of signals $X_1 - X_4$, the X decode unit 21 decodes the particular address input signal to produce a row select signal pulling the positive voltage line or "X" decode line 19 of the selected row of cells 10 high. Correspondingly, the Y decode unit 22 controls the selection of a column of memory cells 10 and receives a column address input signal from any of signals $Y_1 - Y_4$. The Y decode unit 22 decodes the column address input signal to produce a column select signal directed to one pair of sense/write lines associated with a selected column of cells from a total of sixteen pairs of such sense/write lines, thereby holding fifteen of the sense/write line pairs high at any one time by the Y decode unit 22, while the selected pair of sense/write lines corresponding to the selected cell column is not held high by the Y decode unit 22 and can otherwise be controlled by the write or sense circuitry. Thus, the one cell 10 from the entire 16 × 16 matrix 20 addressed by both the X decode unit 21 and the Y decode unit 22 has sufficient voltage between the "X" decode line or positive voltage line 19 and the particular pair of sense/write lines 15, 16 not held high by the Y decode unit 22 to be biased so that the access or sense emitters 11, 13 may be sensed or written on by the I/O unit 24.

In order to write, or to set the state of a cell 10, the X decode line 19 therefor is raised to a suitable voltage and one of the sense/write lines 15 or 16 for the cell 10 is lowered in voltage. For example, assuming that sense/write line 15 is lowered in voltage with respect to the other sense/write line 16, a current will be caused to flow in the sense emitter 11 and the base of transistor $T_1$ through the Schottky diode 18. A much larger collector current flows in transistor $T_1$ through the other Schottky diode 17 with a much larger voltage drop occurring across the other Schottky diode 17 as compared to the voltage drop across the Schottky diode 18. Thus, the base voltage of the transistor $T_2$ is much lower than that of transistor $T_1$. The voltage for the sense/write line 15 is then raised to turn off the sense emitter 11. As the base voltage of the transistor $T_1$ is much higher than that of the transistor $T_2$ and the store emitters, 12, 14 are commonly connected through terminal 34 to a "hold" current source 35, the ratio of the currents in the two store emitters 12, 14 will be:

$$\frac{I_{12}}{I_{14}} = \frac{V_{31}}{V_{30}}$$

where $I_{12}$ is the current for the store emitter 12, $I_{14}$ is the current for the store emitter 14, $V_{31}$ is the base voltage for transistor $T_1$, and $V_{30}$ is the base voltage for transistor $T_2$. The currents $I_{12}$, $I_{14}$ the two store emitters 12, 14 will maintain the voltage differential between the bases of the transistors $T_1$ and $T_2$, thereby retaining the written in state of the cell 10.

For purposes of description, it will be understood that transistor $T_1$ is to be considered conducting and transistor $T_2$ non-conductive when the base voltage of transistor $T_1$ is higher than that of transistor $T_2$. This state may be termed the binary "1" memory state of the cell 10. When the memory cell 10 is in a binary "0" memory state, the transistor $T_2$ is conducting and the transistor $T_1$ is non-conductive. This "O" state is written into the cell 10 by the same procedure described above, except that the sense/write line 16 is lowered in voltage with respect to the sense/write line 15. Thus, a current will be caused to flow in the sense emitter 13 and the base of transistor $T_2$ through the Schottky diode 17, while a much larger collector current flows in transistor $T_2$ through the other Schottky diode 18 causing the base voltage of the transistor $T_2$ to be much higher than that of transistor $T_1$. The binary memory state of the bistable circuit comprising the memory cell 10 is therefore changeable between the binary "1" state and the binary "0" state depending upon the respective voltages at the terminals 32, 33 of the sense/write lines 15, 16 when the X decode line 19 for that particular cell 10 is held high. It will be understood that the designation of the two binary memory states of the cell 10 as described herein is arbitrary and could be reversed. Thus, the state in which transistor $T_1$ is non-conductive and transistor $T_2$ is conducting may be regarded as the binary "1" state, and the state in which transistor $T_1$ is conducting and transistor $T_2$ is non-conductive as the binary "0" state.

In order to sense or read the state of a cell 10 so as to determine which of the two transistors $T_1$, $T_2$ is conducting, the X decode line 19 for that particular cell 10 is raised to a high voltage. The two sense/write lines 15, 16 are then raised to a voltage which is chosen so as to allow the base to emitter voltage of the transistor which is conducting (and whose base is at a higher potential than that of the non-conductive transistor) to provide a source of current to its sense/write line. The non-conductive transistor, having a lower base voltage, will not provide a source of current to its sense/write line. The existence of current in one of the two sense/write lines 15, 16 and not in the other is detected by the sense unit 27, thereby determining or reading the state of the cell 10.

Although a preferred embodiment of the invention has been specifically described, it will be understood that the invention is to be limited only by the appended claims, since variations and modifications of the preferred embodiment will be apparent to those skilled in the art.

What is claimed is:

1. A memory cell for non-destructive addressing and readout, said memory cell comprising:

a pair of sense/write lines also serving as one set of decode lines, a voltage line unconnected to said pair of sense/write lines and serving as the other decode line orthogonally related to said one set of decode lines, a bistable circuit including first and second transistors having respective collector, base and emitter electrodes connected in cross-coupled relationship, each of said emitter electrodes for said first and second transistors including emitter pairs comprising an access/sense emitter and a store emitter, the store emitters of each emitter pair being connected in common, and the access/sense emitters of each emitter pair being respectively connected to the one of the pair of sense/write lines corresponding thereto, a store current source connected to said commonly coupled store emitters for maintaining a standby cell current through said first and second transistors via the store emitters thereof, first and second Schottky diodes respectively connected to the collector electrodes of said first and second transistors at one end thereof and to said voltage line at the other end thereof, the base electrode of said first transistor being connected to a junction point between said second Schottky diode and said collector electrode of said second transistor, and the base electrode of said second transistor being connected to a junction point between said first Schottky diode and said collector electrode of said first transistor.

* * * * *